(12) United States Patent
Shigemitsu et al.

(10) Patent No.: US 10,703,888 B2
(45) Date of Patent: *Jul. 7, 2020

(54) GOLF BALL RESIN COMPOSITION AND GOLF BALL

(71) Applicant: SUMITOMO RUBBER INDUSTRIES, LTD., Kobe-shi, Hyogo (JP)

(72) Inventors: Takahiro Shigemitsu, Kobe (JP); Hidetaka Inoue, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/811,075

(22) Filed: Nov. 13, 2017

(65) Prior Publication Data

US 2018/0171127 A1  Jun. 21, 2018

(30) Foreign Application Priority Data

Dec. 20, 2016  (JP) ................................ 2016-247146

(51) Int. Cl.
*C08L 23/08* (2006.01)
*A63B 37/00* (2006.01)

(52) U.S. Cl.
CPC ........ *C08L 23/0861* (2013.01); *A63B 37/008* (2013.01); *A63B 37/0024* (2013.01); *A63B 37/0029* (2013.01); *A63B 37/0039* (2013.01); *A63B 37/0051* (2013.01); *A63B 37/0075* (2013.01); *C08L 23/0876* (2013.01); *C08L 2205/025* (2013.01); *C08L 2205/03* (2013.01); *C08L 2205/035* (2013.01)

(58) Field of Classification Search
None
See application file for complete search history.

(56) References Cited

U.S. PATENT DOCUMENTS

| 5,330,837 | A | * | 7/1994 | Sullivan | A63B 37/0003 260/998.14 |
| 5,972,447 | A | * | 10/1999 | Hata | B32B 27/08 428/35.7 |
| 6,011,115 | A | * | 1/2000 | Miharu | C08L 23/08 428/34.1 |
| 6,187,864 | B1 | * | 2/2001 | Rajagopalan | A63B 37/0003 473/372 |
| 6,306,968 | B1 | * | 10/2001 | Bellinger | A63B 37/0003 473/354 |
| 6,632,147 | B2 | * | 10/2003 | Cavallaro | A63B 37/0003 473/370 |
| 2009/0270203 | A1 | | 10/2009 | Okabe | |
| 2010/0009776 | A1 | * | 1/2010 | Okabe | A63B 37/0003 473/373 |
| 2010/0087275 | A1 | * | 4/2010 | Isogawa | A63B 37/0003 473/374 |
| 2013/0172104 | A1 | * | 7/2013 | Kennedy, III | C08L 77/06 473/371 |
| 2013/0225749 | A1 | * | 8/2013 | Echt | C08L 29/04 524/501 |
| 2015/0119168 | A1 | * | 4/2015 | Inoue | A63B 37/0037 473/373 |
| 2018/0171128 | A1 | * | 6/2018 | Shigemitsu | C08L 23/0876 |

FOREIGN PATENT DOCUMENTS

| JP | 2000-119516 A | 4/2000 |
| JP | 2004-509200 A | 3/2004 |
| JP | 2009-261791 A | 11/2009 |
| JP | 2009-261792 A | 11/2009 |
| JP | 2010-17414 A | 1/2010 |
| JP | 2011-15763 A | 1/2011 |
| WO | WO 02/22729 A1 | 3/2002 |

* cited by examiner

*Primary Examiner* — David J Buttner
(74) *Attorney, Agent, or Firm* — Birch, Stewart, Kolasch & Birch, LLP

(57) ABSTRACT

An object of the present invention is to provide a golf ball resin composition having improved rebound resilience performance. The present invention provides a golf ball resin composition containing: (A) a thermoplastic resin having an infrared absorption peak in a region from 3200 $cm^{-1}$ to 3600 $cm^{-1}$, and (B) at least one resin component selected from the group consisting of (b-1) a binary copolymer composed of an olefin and an $\alpha,\beta$-unsaturated carboxylic acid having 3 to 8 carbon atoms, (b-2) a metal ion-neutralized product of a binary copolymer composed of an olefin and an $\alpha,\beta$-unsaturated carboxylic acid having 3 to 8 carbon atoms, (b-3) a ternary copolymer composed of an olefin, an $\alpha,\beta$-unsaturated carboxylic acid having 3 to 8 carbon atoms and an $\alpha,\beta$-unsaturated carboxylic acid ester, and (b-4) a metal ion-neutralized product of a ternary copolymer composed of an olefin, an $\alpha,\beta$-unsaturated carboxylic acid having 3 to 8 carbon atoms and an $\alpha,\beta$-unsaturated carboxylic acid ester, wherein when a relaxation modulus Er (−20° C., 9%) of the golf ball resin composition is measured under conditions of −20° C. and a strain of 9%, a relaxation curve is plotted with the relaxation modulus (MPa) as the vertical axis and a logarithm (ln(t)) of time (sec) as the horizontal axis, and the relaxation curve is linearly approximated to obtain a linear approximation curve, the linear approximation curve has a slope in an absolute value of 7 or more.

18 Claims, 3 Drawing Sheets

GOLF BALL RESIN COMPOSITION AND GOLF BALL

FIELD OF THE INVENTION

The present invention relates to a golf ball resin composition and a golf ball travelling a great flight distance on driver shots.

DESCRIPTION OF THE RELATED ART

A three-piece golf ball or multi-piece golf ball having an intermediate layer showing highly rigid or highly elastic has been proposed.

For example, Japanese Patent Publication No. 2010-17414 A discloses a golf ball comprising a core consisting of a center and one or more intermediate layers covering the center, and a cover covering the core, wherein at least one piece or one layer of the intermediate layers is formed from a highly elastic intermediate layer composition containing: (A) a highly elastic polyamide resin having a flexural modulus in a range from 700 MPa to 5000 MPa, (B) a metal-neutralized product of an ethylene-(meth)acrylic acid copolymer, and (C) a resin having a polar functional group, wherein a ratio of an amount of (A) the highly elastic polyamide resin to an amount of (B) the metal-neutralized product of the ethylene-(meth)acrylic acid copolymer (totally 100 mass %), i.e. (A) the highly elastic polyamide resin/(B) the metal-neutralized product of the ethylene-(meth)acrylic acid copolymer, is (20 mass %–80 mass %)/(80 mass %–20 mass %), and (C) the resin having the polar functional group is contained in an amount ranging from 0.1 part by mass to 20 parts by mass with respect to 100 parts by mass of a total amount of (A) the highly elastic polyamide resin and (B) the metal-neutralized product of the ethylene-(meth)acrylic acid copolymer.

Japanese Patent Publication No. 2009-261791 A discloses a golf ball comprising a core consisting of a center and one or more intermediate layers covering the center, and a cover covering the core, wherein at least one piece or one layer of the intermediate layers is formed from a highly elastic intermediate layer composition containing: (A) a highly elastic resin having a flexural modulus in a range from 700 MPa to 5000 MPa, and (B) an ionomer resin having a flexural modulus in a range from 150 MPa to 1000 MPa, wherein a ratio of an amount of (A) the highly elastic resin to an amount of (B) the ionomer resin (totally 100 mass %), i.e. (A) the highly elastic resin/(B) the ionomer resin, is (20 mass %–80 mass %)/(80 mass % to 20 mass %).

Japanese Patent Publication No. 2009-261792 A discloses a golf ball comprising a core consisting of a center and one or more intermediate layers covering the center, and a cover covering the core, wherein at least one piece or one layer of the intermediate layers is formed from a highly rigid intermediate layer composition containing: (a) an ethylene-(meth)acrylic acid copolymer or a metal-neutralized product thereof, (b) a copolymer composed of an α-olefin and a glycidyl (meth)acrylate or glycidyl unsaturated ether, (c) a polyolefin and (d) an ionomer resin neutralized with a metal type different from that of (a) the metal-neutralized product of the ethylene-(meth)acrylic acid copolymer, as a resin component, wherein in the resin component, a mass ratio ((a+b+c)/d) of a total amount (a+b+c) of (a) the ethylene-(meth)acrylic acid copolymer or the metal-neutralized product thereof, (b) the copolymer composed of the α-olefin and the glycidyl (meth)acrylate or glycidyl unsaturated ether and (c) the polyolefin to an amount of (d) the ionomer resin neutralized with the metal type different from that of (a) the metal-neutralized product of the ethylene-(meth)acrylic acid copolymer, ranges from 95 parts by mass/5 parts by mass to 50 parts by mass/50 parts by mass.

Japanese Patent Publication No. 2000-119516 A discloses a polyamide resin composition formed by melt kneading (A) a polyamide resin and (B) a layered silicate so as to allow an amount of an inorganic ash in the composition to be 0.1 to 50 weight %, wherein at least 40% of a total amino terminal group of the polyamide resin in the composition forms an ion bond with the layered silicate.

Japanese Patent Publication No. 2004-509200 A discloses a polymer-organoclay composite composition containing the following components (A), (B), (C), (D) and (E):

(A) at least one organic thermoplastic polymer having an amine group, (B) at least one organoclay comprising an organic ammonium cation having a specific structure, said organoclay being present in an amount ranging from about 0.1 weight % to about 40 weight % based on a total weight of the components (A), (B), (C), (D) and (E), (C) a thermoplastic resin different from the component (A), said thermoplastic resin being present in an amount ranging from about 0.0 weight % to about 90 weight % based on a total weight of the components (A), (B), (C), (D) and (E), (D) an impact modifier, said impact modifier being present in an amount ranging from about 0 weight % to about 20 weight % based on a total weight of the components (A), (B), (C), (D) and (E), and (E) a compatibilizing agent, said compatibilizing agent being present in an amount ranging from about 0 weight % to about 10 weight % based on a total weight of the components (A), (B), (C), (D) and (E).

Japanese Patent Publication No. 2011-15763 A discloses a golf ball resin composition containing an ionomer resin component which is at least one member selected from a zinc ion-neutralized ionomer resin and a sodium ion-neutralized ionomer resin, a dispersing agent which is at least one member selected from a polyamide and a polyetheramine, and a clay, wherein when the zinc ion-neutralized ionomer resin is contained as the ionomer resin component, the polyamide is contained as the dispersing agent, and when the sodium ion-neutralized ionomer resin is contained as the ionomer resin component, the polyetheramine is contained as the dispersing agent.

SUMMARY OF THE INVENTION

One of the most desirable requirements for a golf ball is to improve the flight distance thereof. As the method of improving the flight distance of a golf ball, a method of utilizing a highly rigid or highly elastic material has been known. However, there is a problem that the golf ball constituent member formed from the highly rigid or highly elastic material has lowered durability.

The present invention has been achieved in view of the above problems. An object of the present invention is to provide a material having an excellent durability and giving a great flight distance. Further, another object of the present invention is to provide a golf ball having an excellent durability and travelling a great flight distance on driver shots.

The present invention that has solved the above problems provides a golf ball resin composition containing: (A) a thermoplastic resin having an infrared absorption peak in a region from 3200 cm$^{-1}$ to 3600 cm$^{-1}$, and (B) at least one resin component selected from the group consisting of (b-1) a binary copolymer composed of an olefin and an α,β-unsaturated carboxylic acid having 3 to 8 carbon atoms, (b-2) a metal ion-neutralized product of a binary copolymer composed of an olefin and an α,β-unsaturated carboxylic acid having 3 to 8 carbon atoms, (b-3) a ternary copolymer composed of an olefin, an α,β-unsaturated carboxylic acid having 3 to 8 carbon atoms and an α,β-unsaturated carboxylic acid ester, and (b-4) a metal ion-neutralized product of a ternary copolymer composed of an olefin, an α,β-unsaturated carboxylic acid having 3 to 8 carbon atoms and an α,β-unsaturated carboxylic acid ester, wherein when a relaxation modulus Er (−20° C., 9%) of the golf ball resin composition is measured under conditions of −20° C. and a strain of 9%, a relaxation curve is plotted with the relaxation modulus (MPa) as the vertical axis and a logarithm (ln(t)) of time (second) as the horizontal axis, and the relaxation curve is linearly approximated to obtain a linear approximation curve, the linear approximation curve has a slope in an absolute value of 7 or more.

If the golf ball resin composition according to the present invention is used, the resultant golf ball has improved durability and resilience. The golf ball having the high resilience travels a great flight distance on driver shots.

DESCRIPTION OF THE PREFERRED EMBODIMENT

[Golf Ball Resin Composition]

Figure 1:
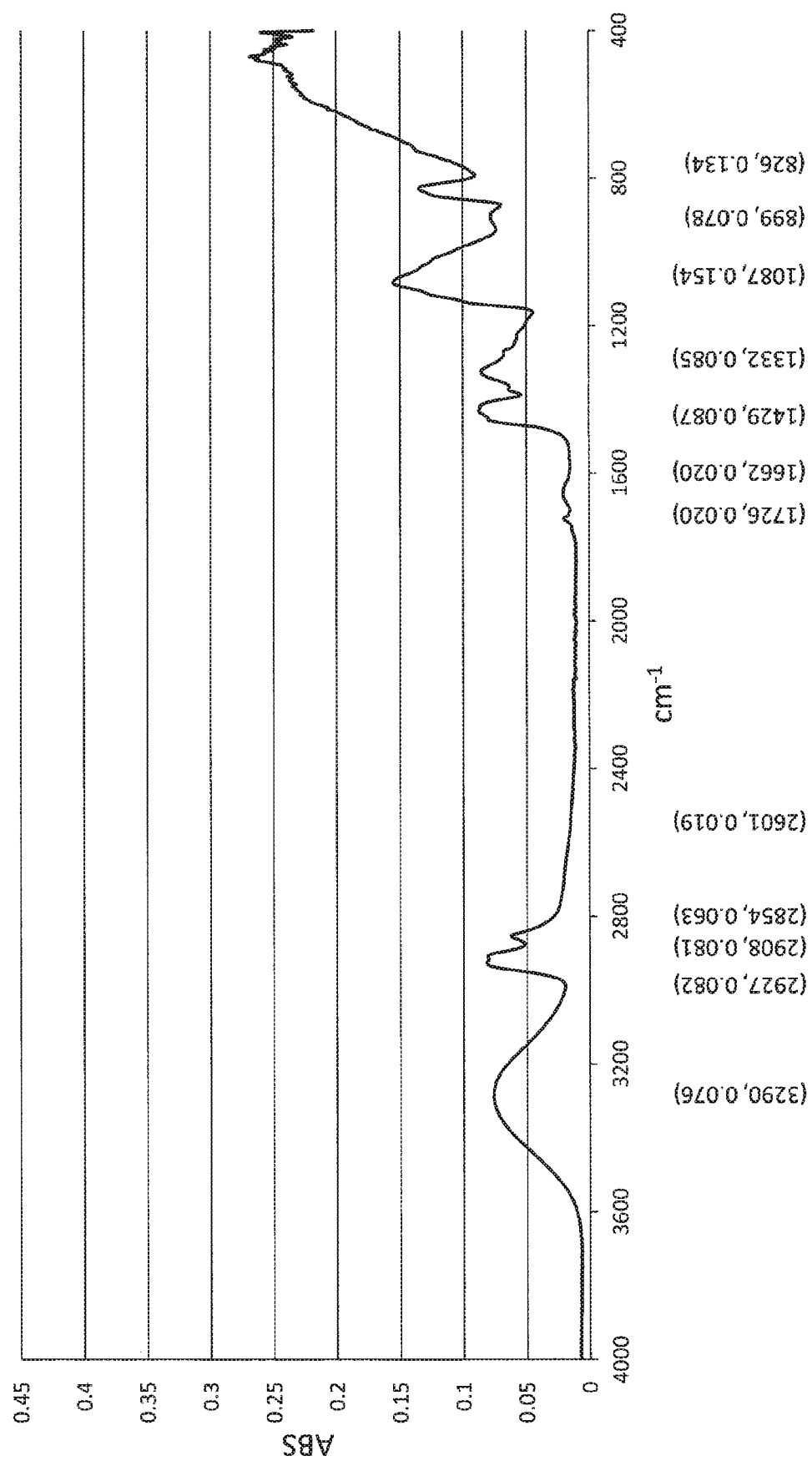
FIG. 1 is an infrared absorption spectrum of one example of (A) a thermoplastic resin having an infrared absorption peak in a region from 3200 $cm^{-1}$ to 3600 $cm^{-1}$.

The present invention provides a golf ball resin composition containing: (A) a thermoplastic resin having an infrared absorption peak in a region from 3200 $cm^{-1}$ to 3600 $cm^{-1}$, and (B) at least one resin component selected from the group consisting of (b-1) a binary copolymer composed of an olefin and an α,β-unsaturated carboxylic acid having 3 to 8 carbon atoms, (b-2) a metal ion-neutralized product of a binary copolymer composed of an olefin and an α,β-unsaturated carboxylic acid having 3 to 8 carbon atoms, (b-3) a ternary copolymer composed of an olefin, an α,β-unsaturated carboxylic acid having 3 to 8 carbon atoms and an α,β-unsaturated carboxylic acid ester, and (b-4) a metal ion-neutralized product of a ternary copolymer composed of an olefin, an α,β-unsaturated carboxylic acid having 3 to 8 carbon atoms and an α,β-unsaturated carboxylic acid ester, wherein when a relaxation modulus Er (−20° C., 9%) of the golf ball resin composition is measured under conditions of −20° C. and a strain of 9%, a relaxation curve is plotted with the relaxation modulus (MPa) as the vertical axis and a logarithm (ln(t)) of time (second) as the horizontal axis, and the relaxation curve is linearly approximated to obtain a linear approximation curve, the linear approximation curve has a slope in an absolute value of 7 or more.

(A) The thermoplastic resin used in the present invention has an absorption peak in the region from 3200 $cm^{-1}$ to 3600 $cm^{-1}$ when the infrared absorption spectrum thereof is measured with a Fourier transform infrared spectrophotometer. The absorption peak in the region from 3200 $cm^{-1}$ to 3600 $cm^{-1}$ is an absorption peak attributed to the active hydrogen group of (A) the thermoplastic resin. (A) The thermoplastic resin having the active hydrogen group forms a hydrogen bond with the carboxyl group of the ionomer resin, and thus has an action on the ion cluster of the ionomer resin. As a result, the resultant golf ball thermoplastic resin composition is considered to have high rebound resilience. Examples of the active hydrogen group include a hydroxyl group, amino group, imino group and so on.

When (A) the thermoplastic resin has a hydroxyl group, intermolecular association or intramolecular association of the hydroxyl group is considered to occur. The absorption peak attributed to OH stretching vibration of the hydroxyl group having the intermolecular association or intramolecular association tends to shift to a lower wave number side than the absorption peak attributed to OH stretching vibration of a free hydroxyl group. The absorption peak attributed to OH stretching vibration of the hydroxyl group having the intermolecular association is considered to appear, for example, in a region from 3200 $cm^{-1}$ to 3550 $cm^{-1}$. The absorption peak attributed to OH stretching vibration of the hydroxyl group having the intramolecular association is considered to appear, for example, in a region from 3450 $cm^{-1}$ to 3570 $cm^{-1}$. In general, the absorption peak attributed to OH stretching vibration of the hydroxyl group is a relatively broad absorption peak. It is noted that as the method for identifying the hydroxyl group of the thermoplastic resin, Raman spectroscopy and the like can be exemplified. These methods and the Fourier transform infrared spectroscopic analysis can be combined to confirm if (A) the thermoplastic resin has a hydroxyl group as the active hydrogen group.

When (A) the thermoplastic resin has an amino group (—$NH_2$), the absorption peak attributed to $NH_2$ stretching vibration of the amino group is considered to appear in the region from 3200 $cm^{-1}$ to 3500 $cm^{-1}$. In addition, when (A) the thermoplastic resin has an imino group (>NH), the absorption peak attributed to NH stretching vibration of the imino group is considered to appear in the region from 3200 $cm^{-1}$ to 3500 $cm^{-1}$. The absorption peak attributed to $NH_2$ stretching vibration of the amino group and the absorption peak attributed to NH stretching vibration of the imino group are sharper than the absorption peak attributed to OH stretching vibration of the hydroxyl group. It is noted that as the method for identifying the amino group or imino group of the thermoplastic resin, Raman spectroscopy and the like can be exemplified. These methods and the Fourier transform infrared spectroscopic analysis can be combined to confirm if (A) the thermoplastic resin has an amino group or imino group as the active hydrogen group.

In addition, (A) the thermoplastic resin preferably has an infrared absorption peak in a region from 2800 $cm^{-1}$ to 3000 $cm^{-1}$. The infrared absorption peak in the region from 2800 $cm^{-1}$ to 3000 $cm^{-1}$ is attributed to C—H stretching of the hydrocarbon backbone (—$CH_2$—) of (A) the thermoplastic resin. More specifically, there is an absorption peak attributed to C—H asymmetrical stretching vibration at 2926±20 $cm^{-1}$, and there is an absorption peak attributed to C—H symmetrical stretching vibration at 2853±20 $cm^{-1}$. It is considered that, the existence of the infrared absorption peak in the region from 2800 $cm^{-1}$ to 3000 $cm^{-1}$ denotes that the thermoplastic resin has a hydrocarbon backbone (—$CH_2$—), i.e. the thermoplastic resin has hydrophobicity. The thermoplastic resin having the infrared absorption peak in the region from 2800 cm$^{-1}$ to 3000 cm$^{-1}$ has high affinity to the polyolefin chain of the ionomer resin. Thus, it is considered that (A) the thermoplastic resin and the ionomer resin are compatibilized, and the golf ball resin composition has higher bending stiffness.

The ratio ($A_{2800\text{-}3000}/A_{3200\text{-}3600}$) of the absorbance of the infrared absorption peak in the region from 2800 cm$^{-1}$ to 3000 cm$^{-1}$ to the absorbance of the infrared absorption peak in the region from 3200 cm$^{-1}$ to 3600 cm$^{-1}$ is preferably 0.5 or more, more preferably 0.6 or more, and even more preferably 0.7 or more, and is preferably 3.0 or less, more preferably 2.9 or less, and even more preferably 2.8 or less. It is noted that the absorbance of the infrared absorption peak of 2926±20 cm$^{-1}$ which is attributed to C—H asymmetrical stretching vibration is adopted as the absorbance of the infrared absorption peak in the region from 2800 cm$^{-1}$ to 3000 cm$^{-1}$. If the absorbance ratio falls within the above range, the ratio of the active hydrogen group (hydrophilicity) of (A) the thermoplastic resin to the hydrocarbon backbone (hydrophobicity) of (A) the thermoplastic resin is suitable, and thus (A) the thermoplastic resin has higher affinity to the ion cluster portion and the polyolefin chain portion of the ionomer resin. As a result, the obtained golf ball resin composition has higher rebound resilience.

Examples of (A) the thermoplastic resin include an ethylene-vinyl alcohol copolymer, a partially saponified product of an ethylene-vinyl acetate copolymer, polyvinyl alcohol, polyamide and the like. (A) The thermoplastic resin is preferably at least one resin selected from the group consisting of ethylene-vinyl alcohol copolymer, partially saponified product of ethylene-vinyl acetate copolymer, polyvinyl alcohol and polyamide.

The amount of ethylene in the ethylene-vinyl alcohol copolymer is preferably 15 mole % or more, more preferably 20 mole % or more, and even more preferably 25 mole % or more, and is preferably 60 mole % or less, more preferably 55 mole % or less, and even more preferably 50 mole % or less. If the amount of ethylene falls with the above range, the ethylene-vinyl alcohol copolymer has desirable thermoplasticity, and the melt kneading of the ethylene-vinyl alcohol copolymer with the ionomer becomes easier.

The amount of vinyl acetate in the ethylene-vinyl acetate copolymer before the saponification for forming the partially saponified product of the ethylene-vinyl acetate copolymer is preferably 1 mass % or more, more preferably 2 mass % or more, and even more preferably 3 mass % or more, and is preferably 50 mass % or less, more preferably 45 mass % or less, and even more preferably 42 mass % or less. In addition, the partially saponified product of the ethylene-vinyl acetate copolymer preferably has a saponification degree of 10 mole % or more, more preferably 15 mole % or more, and even more preferably 20 mole % or more, and preferably has a saponification degree of 98 mole % or less, more preferably 95 mole % or less, and even more preferably 90 mole % or less. It is noted that in case of full saponification, ethylene-vinyl alcohol copolymer is formed.

FIG. 1 shows an infrared absorption spectrum of the ethylene-vinyl alcohol copolymer (EVOH) which is preferably used in the present invention. The numbers in the parentheses of each absorption peak are wave number (cm$^{-1}$) and absorbance (ABS). An absorption peak attributed to OH stretching vibration of the hydroxyl group appears at 3290 cm$^{-1}$. An absorption peak attributed to C—H stretching of the hydrocarbon backbone (—CH$_2$—) appears at 2927 cm$^{-1}$. The ratio ($A_{2800\text{-}3000}/A_{3200\text{-}3600}$) of this ethylene-vinyl alcohol copolymer is 0.082/0.076, i.e. 1.08.

As (A) the thermoplastic resin, a mixture of the ethylene-vinyl alcohol copolymer (EVOH) and a polyamide (PA) is also preferably used. In this case, the mass ratio (EVOH/PA) of the ethylene-vinyl alcohol copolymer to the polyamide is preferably 1/99 or more, more preferably 5/95 or more, and even more preferably 10/90 or more, and is preferably 99/1 or less, more preferably 95/5 or less, and even more preferably 90/10 or less.

Examples of the polyamide include an aliphatic polyamide, semi-aromatic polyamide and aromatic polyamide. Examples of the aliphatic polyamide include polyamide 6, polyamide 11, polyamide 12, polyamide 66, polyamide 610, and polyamide 612. Examples of the semi-aromatic polyamide include polyamide 6T, polyamide 6I, polyamide 9T, and polyamide MST. Examples of the aromatic polyamide include poly-p-phenylene terephthalamide, poly-m-phenylene isophthalamide. These polyamides may be used solely, or two or more of them may be used in combination. Among them, the aliphatic polyamide is preferred, and polyamide 6, polyamide 66, polyamide 11, polyamide 12 and polyamide 610 are particularly suitable, from the viewpoint of processability and durability.

The bending stiffness of (A) the thermoplastic resin having the infrared absorption peak in the region from 3200 cm$^{-1}$ to 3600 cm$^{-1}$ is preferably 300 MPa or more, more preferably 310 MPa or more, even more preferably 400 MPa or more, and most preferably 600 MPa or more, and is preferably 5,000 MPa or less, more preferably 4,900 MPa or less, and even more preferably 4,800 MPa or less. If the bending stiffness of (A) the thermoplastic resin is 300 MPa or more, the obtained golf ball constituent member is highly elastic. As a result, the golf ball shows a greater initial velocity. In addition, if the bending stiffness of (A) the thermoplastic resin is 5,000 MPa or less, the obtained golf ball constituent member does not become excessively hard and thus the shot feeling and the durability become better.

The slab hardness of (A) the thermoplastic resin having the infrared absorption peak in the region from 3200 cm$^{-1}$ to 3600 cm$^{-1}$ is preferably 50 or more, more preferably 55 or more, and even more preferably 60 or more in Shore D hardness, and is preferably 95 or less, more preferably 90 or less, and even more preferably 85 or less in Shore D hardness. If the slab hardness is 50 or more in Shore D hardness, the resilience becomes higher, and if the slab hardness is 95 or less in Shore D hardness, the durability and the shot feeling become better.

Next, the component (B) used in the present invention will be described. The golf ball resin composition according to the present invention contains (B) at least one resin component selected from the group consisting of (b-1) a binary copolymer composed of an olefin and an α,β-unsaturated carboxylic acid having 3 to 8 carbon atoms, (b-2) a metal ion-neutralized product of a binary copolymer composed of an olefin and an α,β-unsaturated carboxylic acid having 3 to 8 carbon atoms, (b-3) a ternary copolymer composed of an olefin, an α,β-unsaturated carboxylic acid having 3 to 8 carbon atoms and an α,β-unsaturated carboxylic acid ester, and (b-4) a metal ion-neutralized product of a ternary copolymer composed of an olefin, an α,β-unsaturated carboxylic acid having 3 to 8 carbon atoms and an α,β-unsaturated carboxylic acid ester.

The component (b-1) is a nonionic binary copolymer composed of an olefin and an α,β-unsaturated carboxylic acid having 3 to 8 carbon atoms wherein carboxyl groups thereof are not neutralized. In addition, examples of the component (b-2) include an ionomer resin obtained by neutralizing at least a part of carboxyl groups in a binary copolymer composed of an olefin and α,β-unsaturated carboxylic acid having 3 to 8 carbon atoms with a metal ion.

The component (b-3) is a nonionic ternary copolymer composed of an olefin, an α,β-unsaturated carboxylic acid having 3 to 8 carbon atoms and an α,β-unsaturated carboxylic acid ester wherein carboxyl groups thereof are not neutralized. In addition, examples of the component (b-4) include an ionomer resin obtained by neutralizing at least a part of carboxyl groups in a ternary copolymer composed of an olefin, an α,β-unsaturated carboxylic acid having 3 to 8 carbon atoms and an α,β-unsaturated carboxylic acid ester with a metal ion.

It is noted that, in the present invention, "(b-1) a binary copolymer composed of an olefin and an α,β-unsaturated carboxylic acid having 3 to 8 carbon atoms" is sometimes simply referred to as "(b-1) a binary copolymer", "(b-2) a metal ion-neutralized product of a binary copolymer composed of an olefin and an α,β-unsaturated carboxylic acid having 3 to 8 carbon atoms" is sometimes simply referred to as "(b-2) a binary ionomer resin", "(b-3) a ternary copolymer composed of an olefin, an α,β-unsaturated carboxylic acid having 3 to 8 carbon atoms and an α,β-unsaturated carboxylic acid ester" is sometimes simply referred to as "(b-3) a ternary copolymer", and "(b-4) a metal ion-neutralized product of a ternary copolymer composed of an olefin, an α,β-unsaturated carboxylic acid having 3 to 8 carbon atoms and an α,β-unsaturated carboxylic acid ester" is sometimes simply referred to as "(b-4) a ternary ionomer resin".

The golf ball resin composition according to the present invention preferably contains (b-2) the binary ionomer resin and/or (b-4) the ternary ionomer resin as the component (B). In the case that the golf ball resin composition according to the present invention contains the component (B) consisting of (b-1) the binary copolymer and/or (b-3) the ternary copolymer, it is preferred that the golf ball resin composition according to the present invention further contains a metal compound. Neutralizing the carboxyl groups of (b-1) the binary copolymer and/or (b-3) the ternary copolymer with the metal compound in the golf ball resin composition provides substantially the same effect as using (b-2) the binary ionomer resin and/or (b-4) the ternary ionomer resin.

Examples of the metal compound for neutralizing the carboxyl groups of (b-1) the binary copolymer and/or (b-3) the ternary copolymer include a metal hydroxide such as magnesium hydroxide, zinc hydroxide, calcium hydroxide, sodium hydroxide, lithium hydroxide, potassium hydroxide, and copper hydroxide; a metal oxide such as magnesium oxide, calcium oxide, zinc oxide, and copper oxide; and a metal carbonate such as magnesium carbonate, zinc carbonate, calcium carbonate, sodium carbonate, lithium carbonate, and potassium carbonate.

The olefin is preferably an olefin having 2 to 8 carbon atoms. Examples of the olefin include ethylene, propylene, butene, pentene, hexene, heptene and octene, and ethylene is particularly preferred. Examples of the α,β-unsaturated carboxylic acid having 3 to 8 carbon atoms include acrylic acid, methacrylic acid, fumaric acid, maleic acid and crotonic acid, and acrylic acid or methacrylic acid is particularly preferred. In addition, examples of the α,β-unsaturated carboxylic acid ester include methyl ester, ethyl ester, propyl ester, n-butyl ester, isobutyl ester of acrylic acid, methacrylic acid, fumaric acid and maleic acid, and acrylic acid ester or methacrylic acid ester is particularly preferred.

Preferable examples of (b-1) the binary copolymer include a binary copolymer composed of ethylene and (meth)acrylic acid, and preferable examples of (b-2) the binary ionomer resin include a metal ion-neutralized product of an ethylene-(meth)acrylic acid binary copolymer. Preferable examples of (b-3) the ternary copolymer include a ternary copolymer composed of ethylene, (meth)acrylic acid and (meth)acrylic acid ester, and preferable examples of (b-4) the ternary ionomer resin include a metal ion-neutralized product of a ternary copolymer composed of ethylene, (meth)acrylic acid and (meth)acrylic acid ester. Here, (meth)acrylic acid means acrylic acid and/or methacrylic acid.

The amount of the α,β-unsaturated carboxylic acid component having 3 to 8 carbon atoms in (b-1) the binary copolymer is preferably 5 mass % or more, more preferably 8 mass % or more, and even more preferably 10 mass % or more, and is preferably 30 mass % or less, more preferably 25 mass % or less.

The amount of the α,β-unsaturated carboxylic acid component having 3 to 8 carbon atoms in (b-3) the ternary copolymer is preferably 2 mass % or more, more preferably 3 mass % or more, and is preferably 30 mass % or less, more preferably 25 mass % or less.

The melt flow rate (190° C., 2.16 kgf) of (b-1) the binary copolymer or (b-3) the ternary copolymer is preferably 5 g/10 min or more, more preferably 10 g/10 min or more, and even more preferably 15 g/10 min or more, and is preferably 1,700 g/10 min or less, more preferably 1,500 g/10 min or less, and even more preferably 1,300 g/10 min or less. If the melt flow rate (190° C., 2.16 kgf) of (b-1) the binary copolymer or (b-3) the ternary copolymer is 5 g/10 min or more, the golf ball resin composition has better fluidity, and thus the constituent member may be easily molded. In addition, if the melt flow rate (190° C., 2.16 kgf) of (b-1) the binary copolymer or (b-3) the ternary copolymer is 1,700 g/10 min or less, the obtained golf ball has better durability.

Specific examples of (b-1) the binary copolymer include an ethylene-methacrylic acid copolymer having a trade name of "NUCREL (registered trademark) (e.g. "Nucrel N1050H", "Nucrel N2050H", "Nucrel AN4318", "Nucrel N1110H" and "Nucrel N0200H")" available from Mitsui-Du Pont Polychemicals Co., Ltd; and an ethylene-acrylic acid copolymer having a trade name of "PRIMACOR (registered trademark) 5980I" available from Dow Chemical Company.

Specific examples of (b-3) the ternary copolymer include "NUCREL (registered trademark) (e.g. "NUCREL AN4318" and "NUCREL AN4319")" available from Mitsui-Du Pont Polychemicals Co., Ltd; "NUCREL (registered trademark) (e.g. "NUCREL AE")" available from E.I. du Pont de Nemours and Company; and "PRIMACOR (registered trademark) (e.g. "PRIMACOR AT310" and "PRIMACOR AT320")" available from Dow Chemical Company. (b-1) The binary copolymer or (b-3) the ternary copolymer may be used solely, or at least two of them may be used in combination.

The amount of the α,β-unsaturated carboxylic acid component having 3 to 8 carbon atoms in the (b-2) the binary ionomer resin is preferably 5 mass % or more, more preferably 8 mass % or more, and even more preferably 10 mass % or more, and is preferably 30 mass % or less, more preferably 25 mass % or less. If the amount of the α,β-unsaturated carboxylic acid component having 3 to 8 carbon atoms is 5 mass % or more, the obtained constituent member having a desired hardness may be easily formed. In addition, if the amount of the α,β-unsaturated carboxylic acid component having 3 to 8 carbon atoms is 30 mass % or less, the obtained constituent member has better durability and shot feeling since the hardness thereof does not become excessively high.

The neutralization degree of the carboxyl group of (b-2) the binary ionomer resin is preferably 15 mole % or more, more preferably 20 mole % or more, and is preferably 90 mole % or less, more preferably 85 mole % or less. If the neutralization degree is 15 mole % or more, the obtained golf ball has better resilience and durability. On the other hand, if the neutralization degree is 90 mole % or less, the golf ball resin composition has better fluidity (good moldability). It is noted that the neutralization degree of the carboxyl group of (b-2) the binary ionomer resin may be calculated by the following expression.

Neutralization degree of binary ionomer resin (mole %)=100×(mole number of neutralized carboxyl groups in binary ionomer resin/mole number of all carboxyl groups in binary ionomer resin)

Examples of the metal ion for neutralizing at least a part of carboxyl groups of (b-2) the binary ionomer resin include monovalent metal ions such as sodium, potassium, lithium and the like; divalent metals ions such as magnesium, calcium, zinc, barium, cadmium and the like; trivalent metals ions such as aluminum and the like; and other ions such as tin, zirconium and the like. As (b-2) the binary ionomer resin, a mixture of a sodium-neutralized binary ionomer resin and a zinc-neutralized binary ionomer resin is preferably used. If the mixture is used, good resilience as well as good durability is easily obtained.

Specific examples of (b-2) the binary ionomer resin include "Himilan (registered trademark) (e.g. Himilan 1555 (Na), Himilan 1557 (Zn), Himilan 1605 (Na), Himilan 1706 (Zn), Himilan 1707 (Na), Himilan AM7311 (Mg), and Himilan AM7329 (Zn))" available from Mitsui-Du Pont Polychemicals Co., Ltd.

Specific examples of (b-2) the binary ionomer resin further include "Surlyn (registered trademark) (e.g. Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), and Surlyn AD8546 (Li))" available from E.I. du Pont de Nemours and Company.

Specific examples of (b-2) the binary ionomer resin further include "Iotek (registered trademark) (e.g. Iotek 8000 (Na), Iotek 8030 (Na), Iotek 7010 (Zn), and Iotek 7030 (Zn))" available from ExxonMobil Chemical Corporation.

(b-2) The binary ionomer resin exemplified above may be used alone or as a mixture of at least two of them. It is noted that Na, Zn, Li, Mg and the like described in the parentheses after the trade names indicate metal types of neutralizing metal ions of the binary ionomer resins.

The bending stiffness of (b-2) the binary ionomer resin is preferably 140 MPa or more, more preferably 150 MPa or more, and even more preferably 160 MPa or more, and is preferably 550 MPa or less, more preferably 500 MPa or less, and even more preferably 450 MPa or less. If the bending stiffness of (b-2) the binary ionomer resin falls within the above range, the resultant golf ball shows an optimized spin rate on driver shots and thus has more excellent flight performance, and has better durability as well.

The melt flow rate (190° C., 2.16 kgf) of (b-2) the binary ionomer resin is preferably 0.1 g/10 min or more, more preferably 0.5 g/10 min or more, and even more preferably 1.0 g/10 min or more, and is preferably 30 g/10 min or less, more preferably 20 g/10 min or less, and even more preferably 15 g/10 min or less. If the melt flow rate (190° C., 2.16 kgf) of (b-2) the binary ionomer resin is 0.1 g/10 min or more, the golf ball resin composition has better fluidity, and thus, for example, a thin constituent member may be easily molded. In addition, if the melt flow rate (190° C., 2.16 kgf) of (b-2) the binary ionomer resin is 30 g/10 min or less, the obtained golf ball has better durability.

The slab hardness of (b-2) the binary ionomer resin is preferably 50 or more, more preferably 55 or more, and even more preferably 60 or more in Shore D hardness, and is preferably 75 or less, more preferably 73 or less, and even more preferably 70 or less in Shore D hardness. If the slab hardness is 50 or more in Shore D hardness, the obtained constituent member has a high hardness. In addition, if the slab hardness is 75 or less in Shore D hardness, the obtained constituent member does not become excessively hard, and thus the golf ball has better durability.

The amount of the $\alpha,\beta$-unsaturated carboxylic acid component having 3 to 8 carbon atoms in (b-4) the ternary ionomer resin is preferably 2 mass % or more, more preferably 3 mass % or more, and is preferably 30 mass % or less, more preferably 25 mass % or less.

The neutralization degree of the carboxyl group of (b-4) the ternary ionomer resin is preferably 20 mole % or more, more preferably 30 mole % or more, and is preferably 90 mole % or less, more preferably 85 mole % or less. If the neutralization degree is 20 mole % or more, the golf ball obtained by using the golf ball resin composition has better rebound resilience and durability, and if the neutralization degree is 90 mole % or less, the golf ball resin composition has better fluidity (good moldability). It is noted that the neutralization degree of the carboxyl group of (b-4) the ternary ionomer resin may be calculated by the following expression.

Neutralization degree of ternary ionomer resin (mole %)=100×(mole number of neutralized carboxyl groups in ternary ionomer resin/mole number of all carboxyl groups in ternary ionomer resin)

Examples of the metal ion for neutralizing at least a part of carboxyl groups of (b-4) the ternary ionomer resin include monovalent metal ions such as sodium, potassium, lithium and the like; divalent metals ions such as magnesium, calcium, zinc, barium, cadmium and the like; trivalent metals ions such as aluminum and the like; and other ions such as tin, zirconium and the like.

Specific examples of (b-4) the ternary ionomer resin include "Himilan (registered trademark) (e.g. Himilan AM7327 (Zn), Himilan 1855 (Zn), Himilan 1856 (Na), and Himilan AM7331 (Na))" available from Mitsui-Du Pont Polychemicals Co., Ltd; "Surlyn 6320 (Mg), Surlyn 8120 (Na), Surlyn 8320 (Na), Surlyn 9320 (Zn), Surlyn 9320W (Zn) and the like" available from E.I. du Pont de Nemours and Company; and "Iotek 7510 (Zn), Iotek 7520 (Zn) and the like" available from ExxonMobil Chemical Corporation. It is noted that Na, Zn, Mg and the like described in the parentheses after the trade names indicate metal types of neutralizing metal ions of the ternary ionomer resins. (b-4) The ternary ionomer resin may be used alone, or at least two of them may be used in combination.

The bending stiffness of (b-4) the ternary ionomer resin is preferably 10 MPa or more, more preferably 11 MPa or more, and even more preferably 12 MPa or more, and is preferably 100 MPa or less, more preferably 97 MPa or less, and even more preferably 95 MPa or less. If the bending stiffness of (b-4) the ternary ionomer resin falls within the above range, the resultant golf ball shows an optimized spin rate on driver shots and thus has more excellent flight performance, and has better durability as well.

The melt flow rate (190° C., 2.16 kgf) of (b-4) the ternary ionomer resin is preferably 0.1 g/10 min or more, more preferably 0.3 g/10 min or more, and even more preferably 0.5 g/10 min or more, and is preferably 20 g/10 min or less, more preferably 15 g/10 min or less, and even more preferably 10 g/10 min or less. If the melt flow rate (190° C., 2.16 kgf) of (b-4) the ternary ionomer resin is 0.1 g/10 min or more, the golf ball resin composition has better fluidity, and thus a thin constituent member may be easily molded. In addition, if the melt flow rate (190° C., 2.16 kgf) of (b-4) the ternary ionomer resin is 20 g/10 min or less, the obtained golf ball has better durability.

The slab hardness of (b-4) the ternary ionomer resin is preferably 20 or more, more preferably 25 or more, and even more preferably 30 or more in Shore D hardness, and is preferably 70 or less, more preferably 65 or less, and even more preferably 60 or less in Shore D hardness. If the slab hardness is 20 or more in Shore D hardness, the obtained constituent member does not become excessively soft, and thus the golf ball has better resilience. In addition, if the slab hardness is 70 or less in Shore D hardness, the obtained constituent member does not become excessively hard, and thus the golf ball has better durability.

In the golf ball resin composition, a mass ratio ((A)/(B)) of the component (A) to the component (B) preferably ranges from 5/95 to 95/5, more preferably from 15/85 to 80/20, even more preferably from 20/80 to 75/25, and most preferably from 25/75 to 70/30. If the mass ratio of the component (A) to the component (B) falls within the above range, the spin rate on driver shots becomes lower since the bending stiffness is higher, and the flight distance on driver shots becomes greater since the rebound resilience is better. Further, the golf ball has better durability.

The golf ball resin composition according to the present invention may further contain a fluidity modifier. If the fluidity modifier is contained, it becomes easier to mold the constituent member of the golf ball. Examples of the fluidity modifier include a fatty acid and/or a metal salt thereof.

Examples of the fatty acid include, but are not limited to, a saturated fatty acid such as butyric acid, valeric acid, hexanoic acid, heptanoic acid, octanoic acid, pelargonic acid, decanoic acid, lauric acid, myristic acid, palmitic acid, heptadecanoic acid, stearic acid, eicosanoic acid, behenic acid, lignoceric acid and cerotic acid; an unsaturated fatty acid such as palmitoleic acid, oleic acid, linoleic acid, α-linolenic acid, γ-linolenic acid and arachidonic acid.

Examples of the fatty acid metal salt include, but are not limited to, a monovalent metal salt such as a fatty acid sodium salt, fatty acid potassium salt and fatty acid lithium salt; a divalent metal salt such as a fatty acid magnesium salt, fatty acid calcium salt, fatty acid zinc salt, fatty acid barium salt and fatty acid cadmium salt; and a trivalent metal salt such as a fatty acid aluminum salt. Among them, as the fatty acid metal salt, the divalent metal salt of the saturated fatty acid such as magnesium stearate, calcium stearate, zinc stearate, barium stearate, copper stearate is preferred.

The amount of the fluidity modifier is preferably 0.5 part by mass or more, more preferably 1.5 parts by mass or more, and is preferably 30 parts by mass or less, more preferably 25 parts by mass or less, with respect to 100 parts by mass of the total amount of the component (A) and the component (B). If the amount of the fluidity modifier falls with the above range, the golf ball resin composition has better fluidity. As a result, a thin constituent member may be molded.

The golf ball resin composition according to the present invention may further contain a pigment component such as a white pigment (e.g. titanium oxide) and a blue pigment, a weight adjusting agent, a dispersant, an antioxidant, an ultraviolet absorber, a light stabilizer, a fluorescent material or a fluorescent brightener, unless they impair the performance of the golf ball.

The golf ball resin composition according to the present invention contains the component (A) and the component (B) as the resin component. The total amount of the component (A) and the component (B) in the resin component is preferably 50 mass % or more, more preferably 55 mass % or more, and even more preferably 60 mass % or more. It is also preferred that the resin component consists of the component (A) and the component (B).

In addition, in another embodiment of the present invention, the golf ball resin composition preferably does not contain a compatibilizer which is used to compatibilize the component (A) and the component (B), or a fluidity modifier which is used to improve the fluidity of the resin composition. If the fluidity modifier is not contained, lowering in mechanical properties of the golf ball resin composition can be suppressed, and if the compatibilizer is not contained, the blending workability becomes better. Examples of the compatibilizer include an ethylene-acrylic acid-glycidyl methacrylate copolymer, and methyl methacrylate-glycidyl methacrylate copolymer. Examples of the fluidity modifier include a fatty acid and/or a metal salt.

When a relaxation modulus $Er_{(-20)}$ of the golf ball resin composition according to the present invention is measured under conditions of a temperature of −20° C. and a strain of 9%, a relaxation curve is plotted with the relaxation modulus (MPa) as the vertical axis and a logarithm (ln(t)) of time (second) as the horizontal axis, and the relaxation curve is linearly approximated to obtain a linear approximation curve, the linear approximation curve has a slope in an absolute value (X) of 7 or more. The relaxation modulus when hitting the golf ball at normal temperature cannot be measured. In the present invention, the relaxation modulus when hitting the golf ball at normal temperature is measured by plotting a master curve according to time-temperature superposition principle and performing the evaluation at −20° C. As a result, the inventors find that when a relaxation modulus $Er_{(-20)}$ of the golf ball resin composition is measured under conditions of a temperature of −20° C. and a strain of 9%, a relaxation curve is plotted with the relaxation modulus (MPa) as the vertical axis and a logarithm (ln(t)) of time (sec) as the horizontal axis, and the relaxation curve is linearly approximated to obtain a linear approximation curve, if the linear approximation curve has a slope in an absolute value (X) of 7 or more, the obtained golf ball has high resilience. The absolute value (X) of the slope of the linear approximation curve is more preferably 8 or more, and even more preferably 9 or more. The linear approximation curve can be obtained by a least square method. The upper limit of the absolute value (X) of the slope of the linear approximation curve is preferably 100, without any limitation.

The melt flow rate (240° C.×2.16 kgf) of the golf ball resin composition according to the present invention is preferably 1 g/10 min or more, more preferably 2 g/10 min or more, and even more preferably 3 g/10 min or more, and is preferably 500 g/10 min or less, more preferably 450 g/10 min or less, and even more preferably 400 g/10 min or less. If the melt flow rate of the golf ball resin composition falls within the above range, the moldability is better.

The bending stiffness of the golf ball resin composition according to the present invention is preferably 250 MPa or more, more preferably 300 MPa or more, and even more preferably 350 MPa or more, and is preferably 1000 MPa or less, more preferably 950 MPa or less, and even more preferably 900 MPa or less. If the bending stiffness of the golf ball resin composition is 250 MPa or more, the rebound resilience is higher, and if the bending stiffness of the golf ball resin composition is 1000 MPa or less, the golf ball has better durability and shot feeling. Herein, the bending stiffness of the golf ball resin composition is a bending stiffness of the golf ball resin composition molded into a sheet form, and is measured by the measurement method described later.

The slab hardness of the golf ball resin composition according to the present invention is preferably 50 or more, more preferably 55 or more, and even more preferably 60 or more in Shore D hardness, and is preferably 90 or less, more preferably 85 or less, and even more preferably 80 or less in Shore D hardness. If the slab hardness is 50 or more in Shore D hardness, the rebound resilience is higher, and if the slab hardness is 90 or less in Shore D hardness, the golf ball has better durability and shot feeling. Herein, the slab hardness of the golf ball resin composition is a slab hardness of the golf ball resin composition molded into a sheet form, and is measured by the measurement method described later.

The rebound resilience of the golf ball resin composition according to the present invention is preferably 40% or more, more preferably 41% or more, and even more preferably 42% or more. If the rebound resilience is 40% or more, the golf ball shows higher resilience thereby traveling a greater flight distance. Herein, the rebound resilience of the golf ball resin composition is rebound resilience of the golf ball resin composition molded into a sheet form, and is measured by the measurement method described later.

The golf ball resin composition can be obtained, for example, by dry blending the component (A) and the component (B) or by melting blending the component (A) and the component (B). The melting blending can be conducted with a kneader or an extruder (such as a single-screw extruder, a twin-screw extruder, and a twin-screw/single-screw extruder).

[Golf Ball]

The golf ball according to the present invention comprises a constituent member formed from the above-described golf ball resin composition. Examples of the construction of the golf ball include, but are not limited to, a two-piece golf ball composed of a single-layered core and a cover covering the core; and a multi-piece golf ball (such as a three-piece golf ball, four-piece golf ball, five-piece golf ball and so on) composed of a core, one or more intermediate layers covering the core and a cover covering the intermediate layers.

The constituent member formed from the above-described golf ball resin composition may be any one among the core, the intermediate layer and the cover, and is preferably the intermediate layer. It is noted that the part of the golf ball other than the constituent member formed from the above-described golf ball resin composition may be formed from a conventional material.

The core may be formed by using a conventional rubber composition (hereinafter, sometimes simply referred to as "core rubber composition"). For example, the core may be formed by heat pressing a rubber composition containing a base rubber, a co-crosslinking agent, and a crosslinking initiator.

As the base rubber, particularly preferred is a high cis-polybutadiene having a cis-bond which is beneficial to the resilience in an amount of 40 mass % or more, preferably 70 mass % or more, and more preferably 90 mass % or more. As the co-crosslinking agent, an α,β-unsaturated carboxylic acid having 3 to 8 carbon atoms or a metal salt thereof is preferred, and acrylic acid metal salt and methacrylic acid metal salt are more preferred. As the metal constituting the metal salt, zinc, magnesium, calcium, aluminum and sodium are preferred, and zinc is more preferred. The amount of the co-crosslinking agent is preferably 20 parts by mass or more and 50 parts by mass or less with respect to 100 parts by mass of the base rubber. As the crosslinking initiator, an organic peroxide is preferably used. Specific examples of the organic peroxide include dicumyl peroxide, 1,1-bis(t-butylperoxy)-3,3,5-trimethylcyclohexane, 2,5-dimethyl-2,5-di (t-butylperoxy) hexane and di-t-butyl peroxide. Among them, dicumyl peroxide is preferably used. The amount of the crosslinking initiator is preferably 0.2 part by mass or more, more preferably 0.3 part by mass or more, and is preferably 3 parts by mass or less, more preferably 2 parts by mass or less, with respect to 100 parts by mass of the base rubber.

The core rubber composition may further contain an organic sulfur compound. Examples of the organic sulfur compound include diphenyl disulfides, thiophenols, and thionaphthols. The amount of the organic sulfur compound is preferably 0.1 part by mass or more, more preferably 0.3 part by mass or more, and is preferably 5.0 parts by mass or less, more preferably 3.0 parts by mass or less, with respect to 100 parts by mass of the base rubber. The core rubber composition may further contain a carboxylic acid and/or a salt thereof. As the carboxylic acid and/or the salt thereof, a carboxylic acid having 1 to 30 carbon atoms and/or a salt thereof is preferred. The amount of the carboxylic acid and/or the salt thereof is 1 part by mass or more and 40 parts by mass or less with respect to 100 parts by mass of the base rubber.

The core rubber composition may further contain a weight adjusting agent such as zinc oxide and barium sulfate, an antioxidant, a colored powder, or the like appropriately, in addition to the base rubber, the co-crosslinking agent, the crosslinking initiator and the organic sulfur compound. Conditions for molding the core rubber composition by a heat pressing method may be set appropriately in accordance with the formulation of the core rubber composition. Generally, it is preferred that the core rubber composition is heated at 130° C. to 200° C. for 10 to 60 minutes, or alternatively the core rubber composition is subjected to a two-step heating, i.e. the core rubber composition is heated at 130° C. to 150° C. for 20 to 40 minutes and then heated at 160° C. to 180° C. for 5 to 15 minutes. The core preferably has, but is not limited to, a spherical shape.

Examples of the intermediate layer material include a thermoplastic resin such as a polyurethane resin, an ionomer resin, a polyamide resin, and polyethylene; a thermoplastic elastomer such as a styrene elastomer, a polyolefin elastomer, a polyurethane elastomer, and a polyester elastomer; and a cured product of a rubber composition. Herein, examples of the ionomer resin include a product prepared by neutralizing at least a part of carboxyl groups in a copolymer composed of ethylene and an α,β-unsaturated carboxylic acid with a metal ion; and a product prepared by neutralizing at least a part of carboxyl groups in a ternary copolymer composed of ethylene, an α,β-unsaturated carboxylic acid and an α,β-unsaturated carboxylic acid ester with a metal ion. The intermediate layer may further contain a weight adjusting agent such as barium sulfate and tungsten, an antioxidant, and a pigment.

Examples of the method for forming the intermediate layer include, but are not limited to, a method which comprises molding the intermediate layer composition into a hemispherical half shell beforehand, covering the core with two of the half shells and performing the compression molding; and a method which comprises injection molding the intermediate layer composition directly onto the core to cover the core.

In the case of injection molding the intermediate layer composition onto the core to form the intermediate layer, it is preferred to use upper and lower molds, each having a hemispherical cavity. When molding the intermediate layer by the injection molding method, the hold pin is protruded to hold the core, and the intermediate layer composition which has been heated and melted is charged and then cooled to form the intermediate layer.

When molding the intermediate layer by the compression molding method, the molding of the half shell may be performed by either a compression molding method or an injection molding method, and the compression molding method is preferred. Compression molding the intermediate layer composition into the half shell may be carried out, for example, under a pressure of 1 MPa or more and 20 MPa or less at a molding temperature of −20° C. or more and +70° C. or less relative to the flow beginning temperature of the intermediate layer composition. If the molding is carried out under the above conditions, the half shell having a uniform thickness can be formed. Examples of the method for molding the intermediate layer by using the half shell include a method of covering the spherical body with two of the half shells and performing the compression molding. Compression molding the half shells into the intermediate layer may be carried out, for example, under a molding pressure of 0.5 MPa or more and 25 MPa or less at a molding temperature of −20° C. or more and +70° C. or less relative to the flow beginning temperature of the intermediate layer composition. If the molding is carried out under the above conditions, the intermediate layer having a uniform thickness can be formed.

It is noted that the molding temperature means the highest temperature where the temperature at the surface of the concave portion of the lower mold reaches from closing the mold to opening the mold. In addition, the flow beginning temperature of the thermoplastic resin composition may be measured using the thermoplastic resin composition in a pellet form under the following conditions with "Flow Tester CFT-500" available from Shimadzu Corporation.

Measuring conditions: Plunger area: 1 cm$^2$, Die length: 1 mm, Die diameter: 1 mm, Load: 588.399 N, Starting temperature: 30° C., and Temperature increase rate: 3° C./min.

The thickness of the intermediate layer is preferably 0.3 mm or more, more preferably 0.4 mm or more, and even more preferably 0.5 mm or more, and is preferably 2.5 mm or less, more preferably 2.4 mm or less, and even more preferably 2.3 mm or less. If the intermediate layer has a plurality of layers, it is preferred that the total thickness of the cover layers falls within the above range.

The cover is formed from a cover composition containing a resin component. Examples of the cover material include, but are not limited to, an ionomer resin, polyurethane, polyamide, polyester, polystyrene, and the polyurethane and the ionomer resin are preferred.

Specific examples of the cover material include an ionomer resin having a trade name of "Himilan (registered trademark)" available from Mitsui-Du Pont Polychemicals Co., Ltd; a thermoplastic polyurethane elastomer having a trade name of "Elastollan (registered trademark)" available from BASF Japan Ltd; a thermoplastic polyamide elastomer having a trade name of "Pebax (registered trademark) available from Arkema K. K.; a thermoplastic polyester elastomer having a trade name of "Hytrel (registered trademark)" available from Du Pont-Toray Co., Ltd.; and a thermoplastic styrene elastomer having a trade name of "Rabalon (registered trademark)" or a thermoplastic polyester elastomer having a trade name of "Primalloy" available from Mitsubishi Chemical Corporation. The cover material may be used solely, or at least two of them may be used in combination.

In addition to the above mentioned resin component, the cover may further contain a pigment component such as a white pigment (e.g. titanium oxide), a blue pigment and a red pigment, a weight adjusting agent such as calcium carbonate and barium sulfate, a dispersant, an antioxidant, an ultraviolet absorber, a light stabilizer, a fluorescent material or a fluorescent brightener, and the like, unless the performance of the cover deteriorates.

Examples of the method for molding the cover composition into the cover include, but are not limited to, a method which comprises injection molding the cover composition directly onto the spherical body having a core or further having an intermediate layer formed thereon; and a method which comprises molding the cover composition into a hollow shell, covering the spherical body with a plurality of the hollow shells and performing the compression molding (preferably a method which comprises molding the cover composition into a hollow half-shell, covering the spherical body with two of the half-shells and performing the compression molding). The golf ball body having the cover formed thereon is ejected from the mold, and is preferably subjected to surface treatments such as deburring, cleaning and sandblast where necessary. In addition, if desired, a paint film or a mark may be formed.

The thickness of the cover is preferably 4.0 mm or less, more preferably 3.0 mm or less, and even more preferably 2.0 mm or less. If the thickness of the cover is 4.0 mm or less, the obtained golf ball has better resilience and shot feeling. The thickness of the cover is preferably 0.3 mm or more, more preferably 0.5 mm or more, even more preferably 0.8 mm or more, and most preferably 1.0 mm or more. If the thickness of the cover is less than 0.3 mm, the durability and the wear resistance of the cover may deteriorate.

The total number of dimples formed on the cover is preferably 200 or more and 500 or less. If the total number of dimples is less than 200, the dimple effect is hardly obtained. On the other hand, if the total number of dimples exceeds 500, the dimple effect is hardly obtained because the size of the respective dimple is small. The shape (shape in a plan view) of dimples formed on the cover includes, without limitation, a circle; a polygonal shape such as a roughly triangular shape, a roughly quadrangular shape, a roughly pentagonal shape and a roughly hexagonal shape; and other irregular shape. These shapes may be employed solely, or at least two of them may be employed in combination.

The golf ball body having the cover formed thereon is ejected from the mold, and is preferably subjected to surface treatments such as deburring, cleaning and sandblast where necessary. In addition, if desired, a paint film or a mark may be formed. The thickness of the paint film is preferably, but not limited to, 5 µm or more, more preferably 7 µm or more, and is preferably 50 µm or less, more preferably 40 µm or less, and even more preferably 30 µm or less. If the thickness of the paint film is less than 5 µm, the paint film is easy to wear off due to the continued use of the golf ball, and if the thickness of the paint film exceeds 50 µm, the dimple effect is reduced and thus the flight performance of the golf ball may be lowered.

The golf ball according to the present invention preferably has a diameter ranging from 40 mm to 45 mm. In light of satisfying the regulation of US Golf Association (USGA), the diameter is particularly preferably 42.67 mm or more. In light of prevention of air resistance, the diameter is more preferably 44 mm or less, particularly preferably 42.80 mm or less. In addition, the golf ball according to the present invention preferably has a mass of 40 g or more and 50 g or less. In light of obtaining greater inertia, the mass is more preferably 44 g or more, particularly preferably 45.00 g or more. In light of satisfying the regulation of USGA, the mass is particularly preferably 45.93 g or less.

When the golf ball according to the present invention has a diameter in a range from 40 mm to 45 mm, the compression deformation amount of the golf ball (shrinking amount of the golf ball along the compression direction) when applying a load from 98 N as an initial load to 1275 N as a final load to the golf ball is preferably 2.0 mm or more, more preferably 2.4 mm or more, even more preferably 2.5 mm or more, and most preferably 2.8 mm or more, and is preferably 5.0 mm or less, more preferably 4.5 mm or less. If the compression deformation amount is 2.0 mm or more, the golf ball does not become excessively hard, and thus the shot feeling thereof becomes better. On the other hand, if the compression deformation amount is 5.0 mm or less, the resilience of the golf ball becomes greater.

Figure 2:
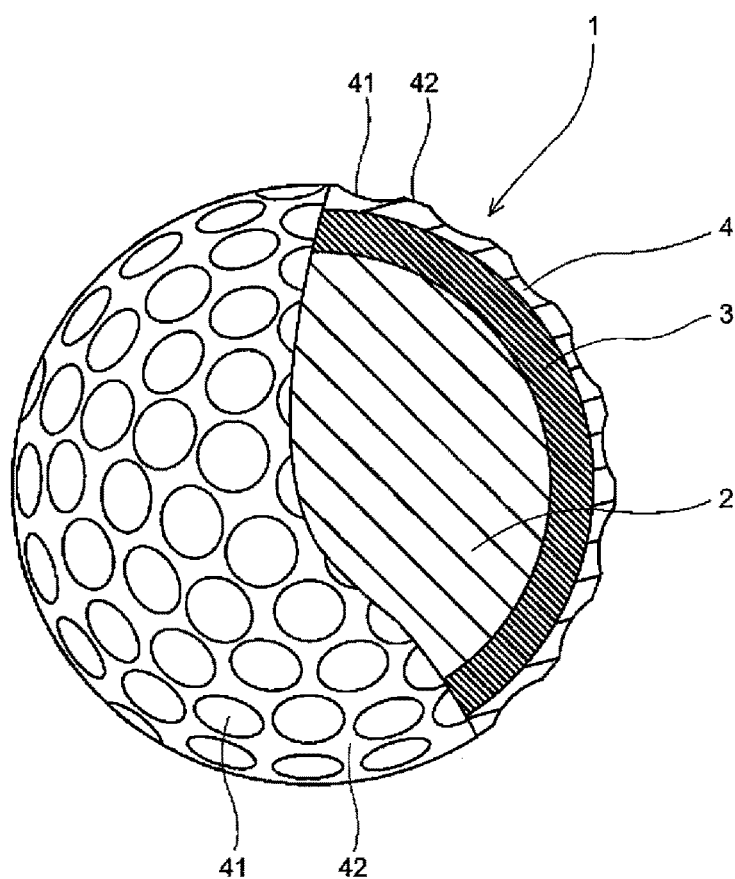
FIG. 2 is a partially cutaway sectional view showing a golf ball according to an embodiment of the present invention.

FIG. 2 is a partially cutaway view of a golf ball 1 according to one embodiment of the present invention. The golf ball 1 comprises a spherical core 2, an intermediate layer 3 disposed outside the spherical core 2, and a cover 4 disposed outside the intermediate layer 3. A plurality of dimples 41 are formed on the surface of the cover 4. Other portions than the dimples 41 on the surface of the cover 4 are land 42. The intermediate layer 3 is formed from the above-described golf ball resin composition.

Examples

Next, the present invention will be described in detail by way of examples. However, the present invention is not limited to the examples described below. Various changes and modifications without departing from the spirit of the present invention are included in the scope of the present invention.

[Measuring Conditions]
(1) FT-IR Measurement (A) The thermoplastic resin was analyzed with an infrared spectrophotometer (Auto IMAGE FT-IR) available from PerkinElmer Co., Ltd. by a Macro ATR method (germanium prism, observation diameter: about 1 mm).

(2) Relaxation Modulus

Sheets with a thickness of about 2 mm were produced by injection molding the golf ball resin composition. The sheets were stored at 23° C. for two weeks. The sheets were punched into a shape of dumbbell No. 4 described in ISO37 (dumbbell No. 7 described in JISK 6251) to obtained test samples, and the stress relaxation test for the test samples was conducted with a viscoelasticity measuring apparatus (EPLEXOR (registered trademark) available from GABO Inc.). The stress σ(t) was measured under conditions of a distance of 10 mm between chuckes, a test temperature of −20° C., a strain of 9%), and a test time of 20 minutes, and the relaxation modulus was calculated according to the following formula.

Relaxation modulus=σ(t)/ε

[In the formula, ε represents a strain (it was 0.09 this time), and σ(t) represents a stress at time t.]

The relaxation curve was plotted with the relaxation modulus obtained above as the vertical axis and the logarithm (ln(t)) of time (second) as the horizontal axis, the relaxation curve was linearly approximated to obtain the linear approximation curve, and the slope of the linear approximation curve was calculated respectively. It is noted that the time from the moment at which the measurement was started to the moment at which the set strain became stable was adopted as t1, and this time was deemed as 0, the data from the moment that another t1 seconds lapsed from that time were adopted.

(3) Bending Stiffness (kgf/Cm²)

Test pieces with a thickness of about 2 mm, a width of 20 mm and a length of 100 mm were produced by injection molding the golf ball resin composition. The test pieces were stored at a temperature of 23° C. plus or minus 2° C. and a relative humidity of 50% plus or minus 5% for 14 days. Load scales of the obtained test piece at bending angles of 3°, 6°, 9° and 12° were measured with Olsen stiffness tester (available from Toyo Seiki Seisaku-sho, Ltd.), the bending angles)(° were plotted in the horizontal axis and the load scale readings were plotted in the vertical axis to obtain a linear approximation curve, and the slope of the linear approximation curve was calculated. Measurement was carried out at a temperature of 23° C. plus or minus 2° C., relative humidity of 50% plus or minus 5%, bending speed of 60°/min, and distance between fulcrums of 50 mm. The bending stiffness was calculated by multiplying the slope value obtained above by 8.7078 and then dividing the obtained product by the cube of thickness (cm) of the test piece. It is noted that the unit of the bending stiffness has been converted into MPa from kgf/cm² in the present invention.

(4) Rebound Resilience (%)

The rebound resilience test was carried out according to JIS K6255 (2013). Sheets with a thickness of about 2 mm were produced by heat pressing the golf ball resin composition at 170° C. for 10 minutes. A cylindrical test piece with a thickness of about 12 mm and a diameter of 28 mm was produced by punching the sheet into a circular shape with a diameter of 28 mm, and stacking six of the obtained circular sheets. The test piece was stored at a temperature of 23° C. plus or minus 2° C. and a relative humidity of 50% plus or minus 5% for 12 hours. The rebound resilience of the obtained test piece was measured with a Lupke type rebound resilience tester (available from Ueshima Seisakusho Co., Ltd.). The planar part of the stacked test piece was held by a mechanical fixing method, and the measurement was carried out at a temperature of 23° C., relative humidity of 50%, impact end diameter of 12.50 mm plus or minus 0.05 mm, impact mass of 0.35 kg plus or minus 0.01 kg and impact speed of 1.4 m/s plus or minus 0.01 m/s.

(5) Slab Hardness (Shore D Hardness)

Sheets with a thickness of about 2 mm were produced by injection molding the cover composition and the golf ball resin composition. The sheets were stored at 23° C. for two weeks. At least three of these sheets were stacked on one another so as not to be affected by the measuring substrate on which the sheets were placed, and the hardness of the stack was measured with an automatic hardness tester (Digitest II, available from Bareiss company) using a detector of "Shore D".

(6) Core Hardness (Shore D Hardness)

The hardness of the core was measured with a type P1 auto loading durometer available from Kobunshi Keiki Co., Ltd., provided with a Shore D type spring hardness tester prescribed in ASTM-D2240. The Shore D hardness measured at the surface of the core was adopted as the surface hardness of the core. In addition, the Shore D hardness measured at the central point of a cut plane which was obtained by cutting the core into two hemispheres was adopted as the center hardness of the core.

(7) Coefficient of Restitution

A metal cylindrical object with a mass of 198.4 g was allowed to collide with each golf ball at a speed of 45 m/sec, and the speeds of the cylindrical object and the golf ball before and after the collision were measured. Based on these speeds and the mass of each object, coefficient of restitution for each golf ball was calculated. The measurement was conducted using twelve samples for each golf ball, and the average value thereof was adopted as the coefficient of restitution of that golf ball. It is noted that the coefficient of restitution of the golf ball No. 15 was defined as 100, and the coefficient of restitution of each golf ball was represented by converting the coefficient of restitution of each golf ball into this index.

(8) Durability

A W #1 driver provided with a metal head (XXIO S, loft angel: 11°, available from Dunlop Sports Limited) was installed on a swing robot M/C available from Golf Laboratories, Inc. Each golf ball was hit repeatedly at a head speed of 45 m/sec until the golf ball was broken, and the hitting times when the golf ball was broken were counted. It is noted that sometimes crack occurred in the intermediate layer even if the golf ball was not exteriorly broken. In this case, judgment regarding whether the golf ball was broken or not was made based on the difference in the deformation or hitting sound of the golf ball. The hitting times of the golf ball No. 15 were defined as 100, and the durability of each golf ball was represented by converting the hitting times of each golf ball into this index. A greater value means better durability of the golf ball.

[Preparation of Golf Ball Resin Composition]

Figure 3:
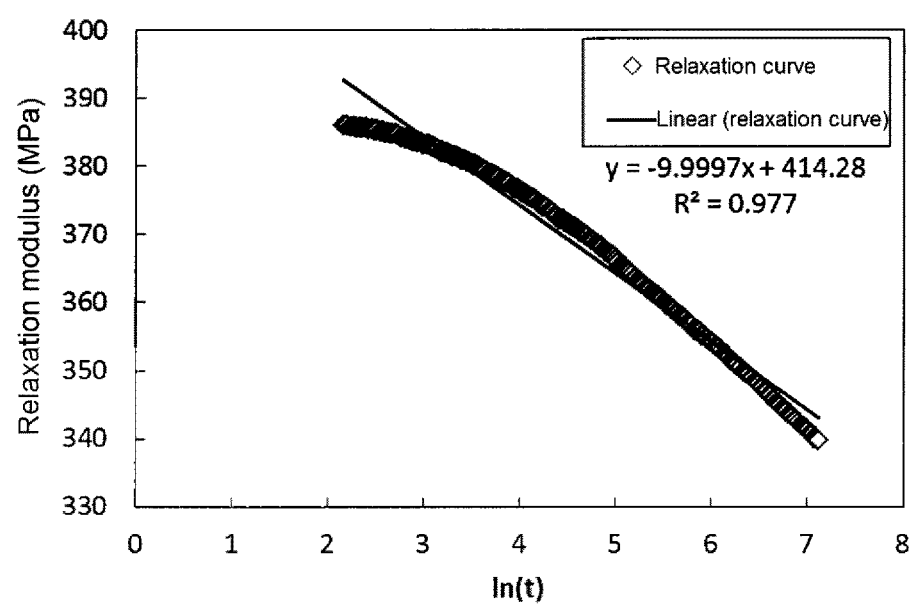
FIG. 3 is a graph showing a relaxation curve of a relaxation modulus of a golf ball resin composition in an inventive example of the present invention.
Figure 4:
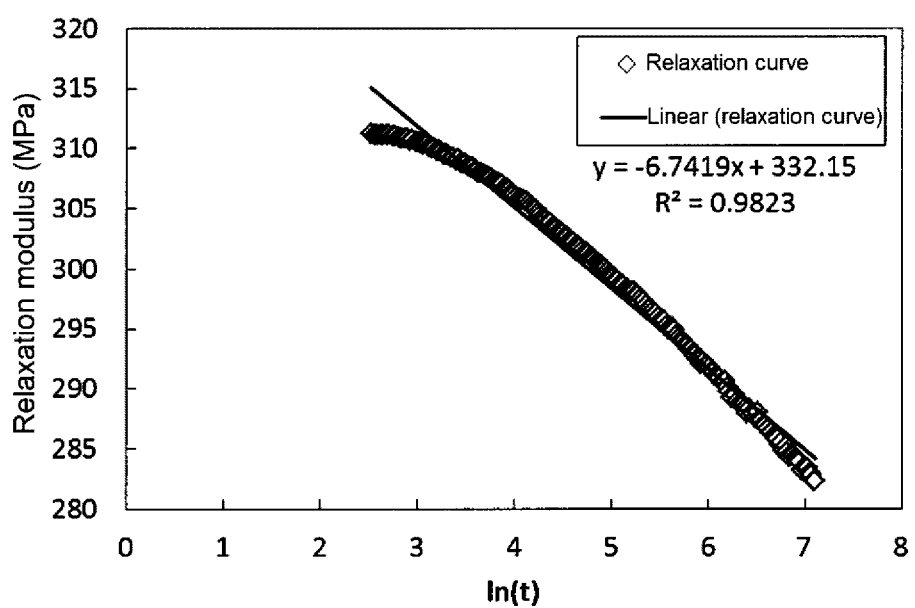
FIG. 4 is a graph showing a relaxation curve of a relaxation modulus of a golf ball resin composition in a comparative example of the present invention.

The materials having the formulations shown in Tables 1 and 2 were extruded with a twin-screw kneading extruder to prepare the golf ball resin compositions in a pellet form. The extruding conditions were a screw diameter of 30 mm, a screw rotational speed of 200 rpm, and screw L/D=30, and the mixture was heated to 220° C. to 250° C. at the die position of the extruder. Properties of the resin components used in Table 2 are shown in Table 3. The relaxation curve of the relaxation modulus of the golf ball resin composition No. 6 is shown in FIG. 3, and the relaxation curve of the relaxation modulus of the golf ball resin composition No. 15 is shown in FIG. 4. In FIG. 3 and FIG. 4, the horizontal axis shows logarithm (ln(t)) of time (second).

TABLE 1

| | Golf ball resin composition No. | | 1 | 2 | 3 | 4 | 5 | 6 |
|---|---|---|---|---|---|---|---|---|
| Formulation (parts by mass) | Component (A) | Ethylene-vinyl alcohol copolymer | 100 | 15 | 30 | 30 | 30 | 5 |
| | | Polyamide | — | — | 5 | 10 | 15 | 40 |
| | Component (B) | Ionomer resin 1 | — | 85 | 65 | 60 | 55 | 55 |
| Resin properties | Component (A) | $A_{2800-3000}/A_{3200-3600}$ | 1.08 | 1.08 | — | — | — | — |
| | Component (A) + Component (B) | Bending stiffness (MPa) | 2371 | 494 | 677 | 626 | 747 | 482 |
| | | Rebound resilience (%) | 46 | 52 | 49 | 48 | 49 | 50 |
| | | Shore D hardness | 87 | 68 | 72 | 72 | 73 | 72 |
| | | Absolute value of slope of relaxation modulus (X) | 67.5 | 7.4 | 8.1 | 8.3 | 8.6 | 10.0 |
| Ball properties | | Coefficient of restitution | NG (crack occurred) | 100.5 | 100.4 | 100.5 | 100.6 | 100.5 |
| | | Durability | 1 | 80 | 65 | 70 | 75 | 85 |

TABLE 2

| | Golf ball resin composition No. | | 7 | 8 | 9 | 10 | 11 | 12 | 13 | 14 | 15 |
|---|---|---|---|---|---|---|---|---|---|---|---|
| Formulation (parts by mass) | Other component than component (A) and component (B) | Polyacetal | 100 | 35 | — | — | — | — | — | — | — |
| | | Polypropylene | — | — | 100 | — | — | — | — | — | — |
| | | Polycarbonate | — | — | — | 35 | — | — | — | — | — |
| | | Polybutylene terephthalate | — | — | — | — | 35 | — | — | — | — |
| | | ABS | — | — | — | — | — | 35 | — | — | — |
| | | PMMA | — | — | — | — | — | — | 35 | — | — |
| | | Polyurethane | — | — | — | — | — | — | — | 100 | — |
| | Component (B) | Ionomer resin 1 | — | 65 | — | 65 | 65 | 65 | 65 | — | — |
| | | Ionomer resin 2 | — | — | — | — | — | — | — | — | 100 |
| Resin properties | | Bending stiffness (MPa) | 780 | 327 | 598 | 494 | 507 | 529 | 576 | 282 | 304 |
| | | Rebound resilience (%) | 52 | 52 | 49 | 49 | 52 | 50 | 50 | 39 | 56 |
| | | Shore D hardness | 75 | 65 | 72 | 68 | 70 | 68 | 72 | 71 | 65 |
| | | Absolute value of slope of relaxation modulus (X) | 8.3 | 4.8 | 3.6 | 5.1 | 6.2 | — | — | 11.1 | 6.7 |
| Ball properties | | Coefficient of restitution | 97.2 | 97.5 | 90.5 | 83.2 | 77.8 | 86.1 | 83.1 | 98.4 | 100 |
| | | Durability | 10 | 8 | 1 | 10 | 6 | 9 | 12 | 10 | 100 |

TABLE 3

| | $A_{2800-3000}/A_{3200-3600}$ | Bending stiffness (MPa) | Shore D hardness |
|---|---|---|---|
| Polyacetal | *1) | 780 | 75 |
| Polypropylene | *1) | 598 | 72 |
| Polycarbonate | *1) | 1432 | 83 |
| Polybutylene terephthalate | *1) | 1424 | 77 |
| ABS | *1) | 1495 | 80 |
| PMMA | *1) | 2105 | 88 |
| Polyurethane | 1.13 | 282 | 71 |

*1) No absorption peak was observed in the region from 3200 cm$^{-1}$ to 3600 cm$^{-1}$.

The details of the materials used in Tables 1 and 2 are shown as follows.

Ethylene-vinyl alcohol copolymer: Soarlite M (bending stiffness: 2371 MPa, Shore D hardness: 87, infrared absorption spectrum: refer to FIG. 1) available from The Nippon Synthetic Chemical Industry Co., Ltd.

Polyamide: Amilan (registered trademark) CM1017K (polyamide 6, bending stiffness: 947 MPa, relative viscosity: 2.65, melt flow rate (260° C., 325 gf): 8.27 g/min) available from Toray Industries, Inc.

Ionomer resin 1: a blend consisting of Surlyn 8150 and Surlyn 9150 available from E.I. du Pont de Nemours and Company in a ratio of 50/50

Polyacetal: Lupital FU 2025 available from Mitsubishi Engineering-Plastics Corporation Polypropylene: Novatec PP MG05ES available from Japan Polypropylene Corporation Polycarbonate: SD Polyca IM-401-10 available from Sumitomo Chemical Co. Ltd.

Polybutylene terephthalate: Novaduran 5010R5L available from Mitsubishi Engineering-Plastics Corporation ABS (acrylonitrile-butadiene-styrene copolymer): ABS EX19C available from UMG ABS, Ltd.

PMMA (polymethyl methacrylate): Acrypet MF available from Mitsubishi Rayon Co., Ltd.

Polyurethane: Elastollan 1174D available from BASF Ltd.

Ionomer resin 2: a blend consisting of Himilan 1605 and Himilan AM7329 available from Du Pont-Mitsui Polychemicals Co., Ltd. in a ratio of 50/50

[Production of Golf Ball]

(1) Production of Core

The rubber composition having the formulation shown in Table 4 was kneaded and heat pressed in upper and lower molds, each having a hemispherical cavity, at 170° C. for 30 minutes to produce cores.

TABLE 4

| | Core | |
|---|---|---|
| Formulation (parts by mass) | Polybutadiene rubber | 100 |
| | Zinc acrylate | 39 |
| | Zinc oxide | 5 |
| | Barium sulfate | Appropriate amount* |
| | Diphenyldisulfide | 0.5 |
| | Dicumyl peroxide | 0.8 |
| Core properties | Diameter (mm) | 39.7 |
| | Surface hardness (Shore D) | 58 |

TABLE 4-continued

| | Core | |
|---|---|---|
| | Center hardness (Shore D) | 41 |
| | Compression deformation amount (mm) | 2.7 |

*As to the amount of barium sulfate, adjustment was made such that the golf ball had a mass of 45.3 g.
Polybutadiene rubber: "BR730 (high-cis polybutadiene)" available from JSR Corporation
Zinc acrylate: "ZNDA-90S" available from Nihon Joryu Kogyo Co., Ltd.
Zinc oxide: "Ginrei R" available from Toho Zinc Co., Ltd.
Barium sulfate: "Barium Sulfate BD" available from Sakai Chemical Industry Co., Ltd.
Dicumyl peroxide: "PERCUMYL (registered trademark) D" available from NOF Corporation
Diphenyldisulfide: available from Sumitomo Seika Chemicals Co., Ltd.

(2) Preparation of Intermediate Layer

The intermediate layer (thickness: 1.0 mm) was formed by injection molding the above-described golf ball resin composition on the core obtained above.

(3) Molding of Half Shells

A polyurethane elastomer (Elastollan (registered trademark) XNY85A available from BASF Ltd.) in an amount of 100 parts by mass and titanium oxide in an amount of 4 parts by mass were dry blended and mixed with a twin-screw kneading extruder to obtain the cover composition (slab hardness: 32 (Shore D hardness)) in a pellet form. The extruding conditions of the cover composition were a screw diameter of 45 mm, a screw rotational speed of 200 rpm, and screw L/D=35, and the mixture was heated to 150 to 230° C. at the die position of the extruder. The compression molding of half shells was conducted by charging the obtained cover composition in the pellet form into each of the depressed part of the lower mold of the mold for molding half shells, and applying pressure to mold the half shells. The compression molding was conducted under the conditions of a molding temperature of 170° C., a molding time of 5 minutes and a molding pressure of 2.94 MPa.

(4) Molding of Cover

The intermediate layer obtained in (2) was concentrically covered with two of the half shells obtained in (3), and compression molding was conducted to form the cover (thickness: 0.5 mm). The compression molding was conducted under the conditions of a molding temperature of 145° C., a molding time of 2 minutes and a molding pressure of 9.8 MPa. The surface of the obtained golf ball body was subjected to a sandblast treatment, and a mark was formed thereon. Then, a clear paint was applied to the golf ball body, and the paint was dried in an oven of 40° C. to obtain a golf ball having a diameter of 42.7 mm and a mass of 45.3 g. Evaluation results regarding the obtained golf balls are shown in Tables 1 and 2.

It is apparent that the golf ball having a constituent member formed from the following golf ball resin composition shows high coefficient of restitution and excellent durability. The golf ball resin composition contains: (A) a thermoplastic resin having an infrared absorption peak in a region from 3200 cm$^{-1}$ to 3600 cm$^{-1}$, and (B) at least one resin component selected from the group consisting of (b-1) a binary copolymer composed of an olefin and an α,β-unsaturated carboxylic acid having 3 to 8 carbon atoms, (b-2) a metal ion-neutralized product of a binary copolymer composed of an olefin and an α,β-unsaturated carboxylic acid having 3 to 8 carbon atoms, (b-3) a ternary copolymer composed of an olefin, an α,β-unsaturated carboxylic acid having 3 to 8 carbon atoms and an α,β-unsaturated carboxylic acid ester, and (b-4) a metal ion-neutralized product of a ternary copolymer composed of an olefin, an α,β-unsaturated carboxylic acid having 3 to 8 carbon atoms and an α,β-unsaturated carboxylic acid ester, wherein when a relaxation modulus Er (−20° C., 9%) of the golf ball resin composition is measured under conditions of −20° C. and a strain of 9%, a relaxation curve is plotted with the relaxation modulus (MPa) as the vertical axis and a logarithm (ln(t)) of time (second) as the horizontal axis, and the relaxation curve is linearly approximated to obtain a linear approximation curve, the linear approximation curve has a slope in an absolute value of 7 or more.

This application is based on Japanese Patent application No. 2016-247146 filed on Dec. 20, 2016, the content of which is hereby incorporated by reference.

The invention claimed is:

1. A golf ball resin composition containing:
(A) a thermoplastic resin having an infrared absorption peak in a region from 3200 $cm^{-1}$ to 3600 $cm^{-1}$, and including a thermoplastic resin having a hydroxyl group, and a thermoplastic resin having an amino group and/or a thermoplastic resin having an imino group, and
(B) at least one resin component selected from the group consisting of (b-1) a binary copolymer composed of an olefin and an α,β-unsaturated carboxylic acid having 3 to 8 carbon atoms, (b-2) a metal ion-neutralized product of a binary copolymer composed of an olefin and an α,β-unsaturated carboxylic acid having 3 to 8 carbon atoms, (b-3) a ternary copolymer composed of an olefin, an α,β-unsaturated carboxylic acid having 3 to 8 carbon atoms and an α,β-unsaturated carboxylic acid ester, and (b-4) a metal ion-neutralized product of a ternary copolymer composed of an olefin, an α,β-unsaturated carboxylic acid having 3 to 8 carbon atoms and an α,β-unsaturated carboxylic acid ester,
wherein the thermoplastic resin having the hydroxyl group is at least one member selected from the group consisting of an ethylene-vinyl alcohol copolymer having the ethylene component in an amount of from 15 mole % to 60 mole %, a partially saponified product of an ethylene-vinyl acetate copolymer and a polyvinyl alcohol,
a mass ratio of the component (A) to the component (B) ranges from 5/95 to 25/75, and
when a relaxation modulus Er (−20° C., 9%) of the golf ball resin composition is measured under conditions of −20° C. and a strain of 9%, a relaxation curve is plotted with the relaxation modulus (MPa) as the vertical axis and a logarithm (ln(t)) of time (second) as the horizontal axis, and the relaxation curve is linearly approximated to obtain a linear approximation curve, the linear approximation curve has a slope in an absolute value of 7 or more.

2. The golf ball resin composition according to claim 1, wherein the mass ratio of the component (A) to the component (B) ranges from 5/95 to 20/80.

3. A golf ball resin composition containing:
(A) a thermoplastic resin having an infrared absorption peak in a region from 3200 $cm^{-1}$ to 3600 $cm^{-1}$, and
(B) at least one resin component selected from the group consisting of (b-1) a binary copolymer composed of an olefin and an α,β-unsaturated carboxylic acid having 3 to 8 carbon atoms, (b-2) a metal ion-neutralized product of a binary copolymer composed of an olefin and an α,β-unsaturated carboxylic acid having 3 to 8 carbon atoms, (b-3) a ternary copolymer composed of an olefin, an α,β-unsaturated carboxylic acid having 3 to 8 carbon atoms and an α,β-unsaturated carboxylic acid ester, and (b-4) a metal ion-neutralized product of a ternary copolymer composed of an olefin, an α,β-unsaturated carboxylic acid having 3 to 8 carbon atoms and an α,β-unsaturated carboxylic acid ester,
wherein the component (A) is a mixture of an ethylene-vinyl alcohol copolymer and a polyamide,
a mass ratio of the component (A) to the component (B) ranges from 5/95 to 25/75, and
when a relaxation modulus Er (−20° C., 9%) of the golf ball resin composition is measured under conditions of −20° C. and a strain of 9%, a relaxation curve is plotted with the relaxation modulus (MPa) as the vertical axis and a logarithm (ln(t)) of time (second) as the horizontal axis, and the relaxation curve is linearly approximated to obtain a linear approximation curve, the linear approximation curve has a slope in an absolute value of 7 or more.

4. The golf ball resin composition according to claim 3, wherein the mass ratio of the component (A) to the component (B) ranges from 5/95 to 20/80.

5. A golf ball having a core, at least one intermediate layer covering the core, and a cover covering the at least one intermediate layer, wherein the at least one intermediate layer is formed from a golf ball resin composition containing:
(A) a thermoplastic resin having an infrared absorption peak in a region from 3200 $cm^{-1}$ to 3600 $cm^{-1}$, and
(B) at least one resin component selected from the group consisting of (b-1) a binary copolymer composed of an olefin and an α,β-unsaturated carboxylic acid having 3 to 8 carbon atoms, (b-2) a metal ion-neutralized product of a binary copolymer composed of an olefin and an α,β-unsaturated carboxylic acid having 3 to 8 carbon atoms, (b-3) a ternary copolymer composed of an olefin, an α,β-unsaturated carboxylic acid having 3 to 8 carbon atoms and an α,β-unsaturated carboxylic acid ester, and (b-4) a metal ion-neutralized product of a ternary copolymer composed of an olefin, an α,β-unsaturated carboxylic acid having 3 to 8 carbon atoms and an α,β-unsaturated carboxylic acid ester,
wherein the component (A) is a mixture of an ethylene-vinyl alcohol copolymer and a polyamide, and a mass ratio of the component (A) to the component (B) ranges from 5/95 to 45/55,
wherein when a relaxation modulus Er (−20° C., 9%) of the golf ball resin composition is measured under conditions of −20° C. and a strain of 9%, a relaxation curve is plotted with the relaxation modulus (MPa) as the vertical axis and a logarithm (ln(t)) of time (second) as the horizontal axis, and the relaxation curve is linearly approximated to obtain a linear approximation curve, the linear approximation curve has a slope in an absolute value of 7 or more, and
wherein the at least one intermediate layer has a thickness of from 1.0 mm to 2.5 mm.

6. The golf ball according to claim 5, wherein (A) the thermoplastic resin has an infrared absorption peak in a region from 2800 $cm^{-1}$ to 3000 $cm^{-1}$, and a ratio ($A_{2800-3000}/A_{3200-3600}$) of an absorbance of the infrared absorption peak in the region from 2800 $cm^{-1}$ to 3000 $cm^{-1}$ to an absorbance of the infrared absorption peak in the region from 3200 $cm^{-1}$ to 3600 $cm^{-1}$ is 0.5 or more and 3.0 or less.

7. The golf ball according to claim 5, wherein (A) the thermoplastic resin has a bending stiffness ranging from 300 MPa to 5,000 MPa.

8. The golf ball according to claim 5, wherein (A) the thermoplastic resin has a slab hardness of 50 or more and 95 or less in Shore D hardness.

9. The golf ball according to claim 5, wherein the golf ball resin composition has a bending stiffness ranging from 250 MPa to 1,000 MPa.

10. The golf ball according to claim 5, wherein the golf ball resin composition has a slab hardness of 50 or more and 90 or less in Shore D hardness.

11. The golf ball according to claim 5, wherein the golf ball resin composition has rebound resilience of 40% or more.

12. A golf ball having a core, at least one intermediate layer covering the core, and a cover covering the at least one intermediate layer, wherein the at least one intermediate layer is formed from a golf ball resin composition containing:
- (A) a thermoplastic resin having an infrared absorption peak in a region from 3200 $cm^{-1}$ to 3600 $cm^{-1}$, and including a thermoplastic resin having a hydroxyl group, and a thermoplastic resin having an amino group and/or a thermoplastic resin having an imino group, and
- (B) at least one resin component selected from the group consisting of (b-1) a binary copolymer composed of an olefin and an α,β-unsaturated carboxylic acid having 3 to 8 carbon atoms, (b-2) a metal ion-neutralized product of a binary copolymer composed of an olefin and an α,β-unsaturated carboxylic acid having 3 to 8 carbon atoms, (b-3) a ternary copolymer composed of an olefin, an α,β-unsaturated carboxylic acid having 3 to 8 carbon atoms and an α,β-unsaturated carboxylic acid ester, and (b-4) a metal ion-neutralized product of a ternary copolymer composed of an olefin, an α,β-unsaturated carboxylic acid having 3 to 8 carbon atoms and an α,β-unsaturated carboxylic acid ester,
wherein the thermoplastic resin having the hydroxyl group is at least one member selected from the group consisting of an ethylene-vinyl alcohol copolymer having the ethylene component in an amount of from 15 mole % to 60 mole %, a partially saponified product of an ethylene-vinyl acetate copolymer and a polyvinyl alcohol,
a mass ratio of the component (A) to the component (B) ranges from 5/95 to 45/55,
when a relaxation modulus Er (−20° C., 9%) of the golf ball resin composition is measured under conditions of −20° C. and a strain of 9%, a relaxation curve is plotted with the relaxation modulus (MPa) as the vertical axis and a logarithm (ln(t)) of time (second) as the horizontal axis, and the relaxation curve is linearly approximated to obtain a linear approximation curve, the linear approximation curve has a slope in an absolute value of 7 or more, and
the at least one intermediate layer has a thickness of from 1.0 mm to 2.5 mm.

13. The golf ball according to claim 12, wherein (A) the thermoplastic resin has an infrared absorption peak in a region from 2800 $cm^{-1}$ to 3000 $cm^{-1}$, and a ratio ($A_{2800-3000}/A_{3200-3600}$) of an absorbance of the infrared absorption peak in the region from 2800 $cm^{-1}$ to 3000 $cm^{-1}$ to an absorbance of the infrared absorption peak in the region from 3200 $cm^{-1}$ to 3600 $cm^{-1}$ is 0.5 or more and 3.0 or less.

14. The golf ball according to claim 12, wherein (A) the thermoplastic resin has a bending stiffness ranging from 300 MPa to 5,000 MPa.

15. The golf ball according to claim 12, wherein (A) the thermoplastic resin has a slab hardness of 50 or more and 95 or less in Shore D hardness.

16. The golf ball according to claim 12, wherein the golf ball resin composition has a bending stiffness ranging from 250 MPa to 1,000 MPa.

17. The golf ball according to claim 12, wherein the golf ball resin composition has a slab hardness of 50 or more and 90 or less in Shore D hardness.

18. The golf ball according to claim 12, wherein the golf ball resin composition has rebound resilience of 40% or more.

* * * * *